No. 801,743. PATENTED OCT. 10, 1905.
S. SALBERG.
APPARATUS FOR MAKING LAMPBLACK.
APPLICATION FILED JAN. 25, 1905.
3 SHEETS—SHEET 2.
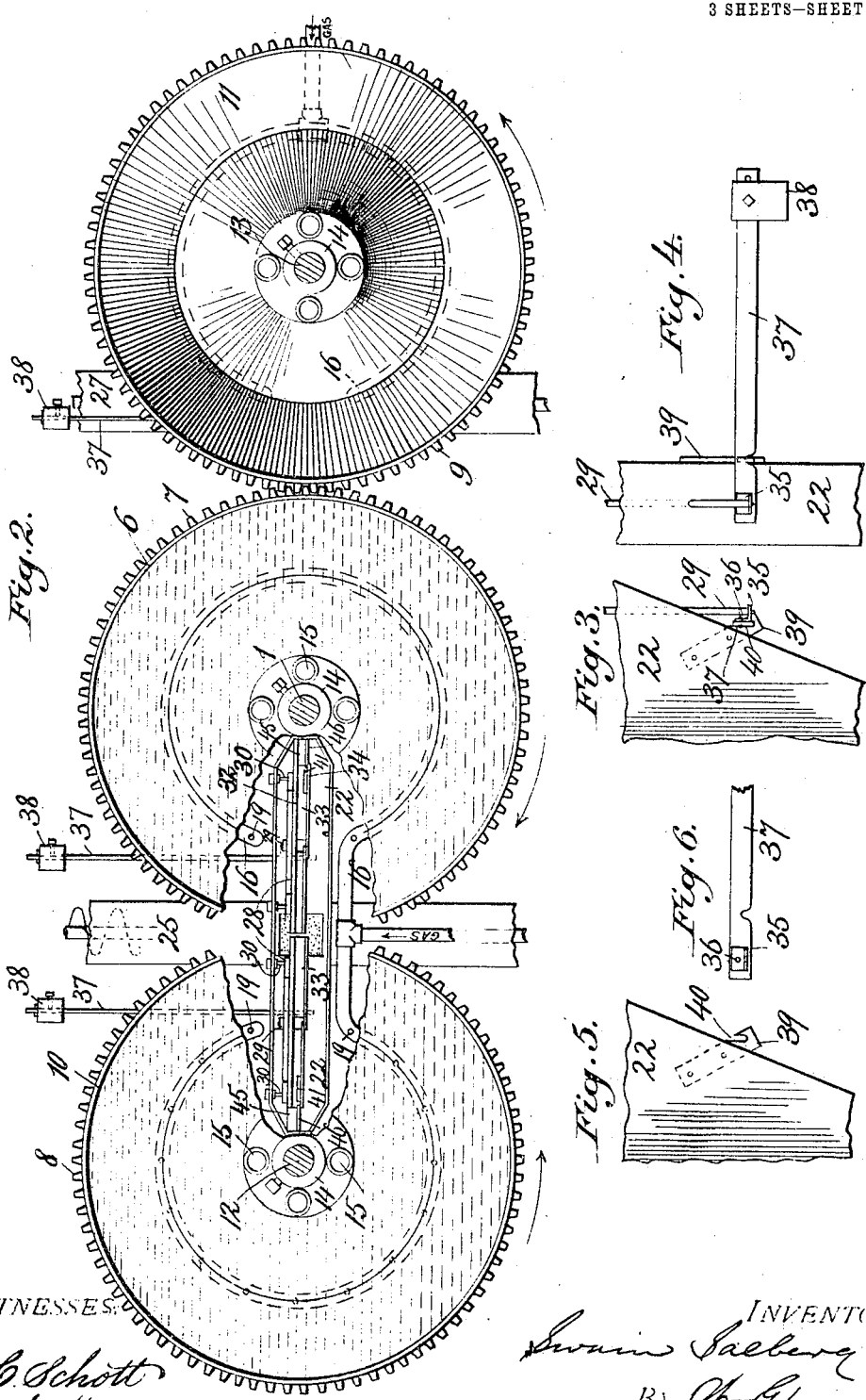
WITNESSES:
F. H. Schott
Jas. S. Miller
INVENTOR
Swain Salberg
BY
Attorney

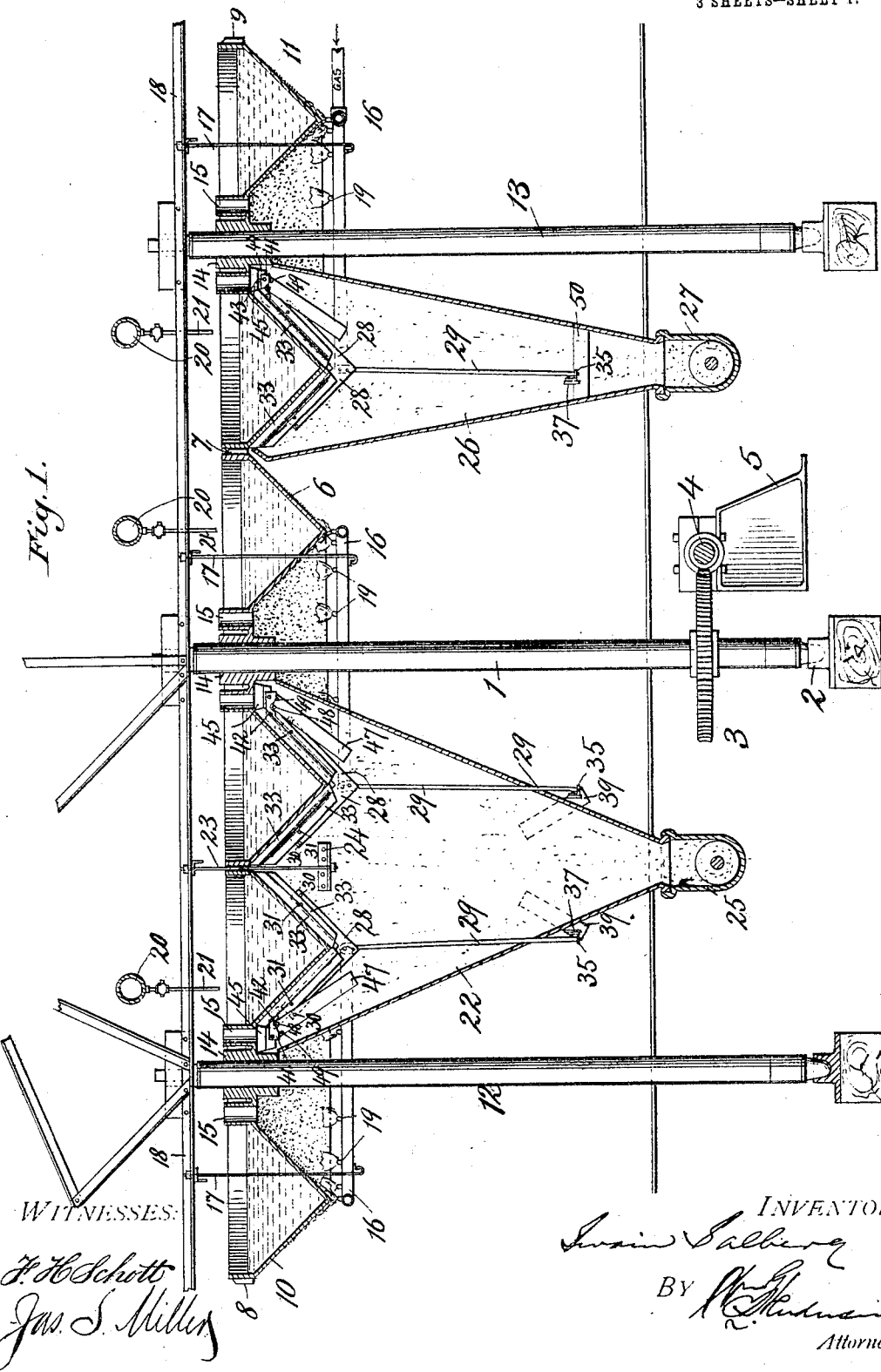

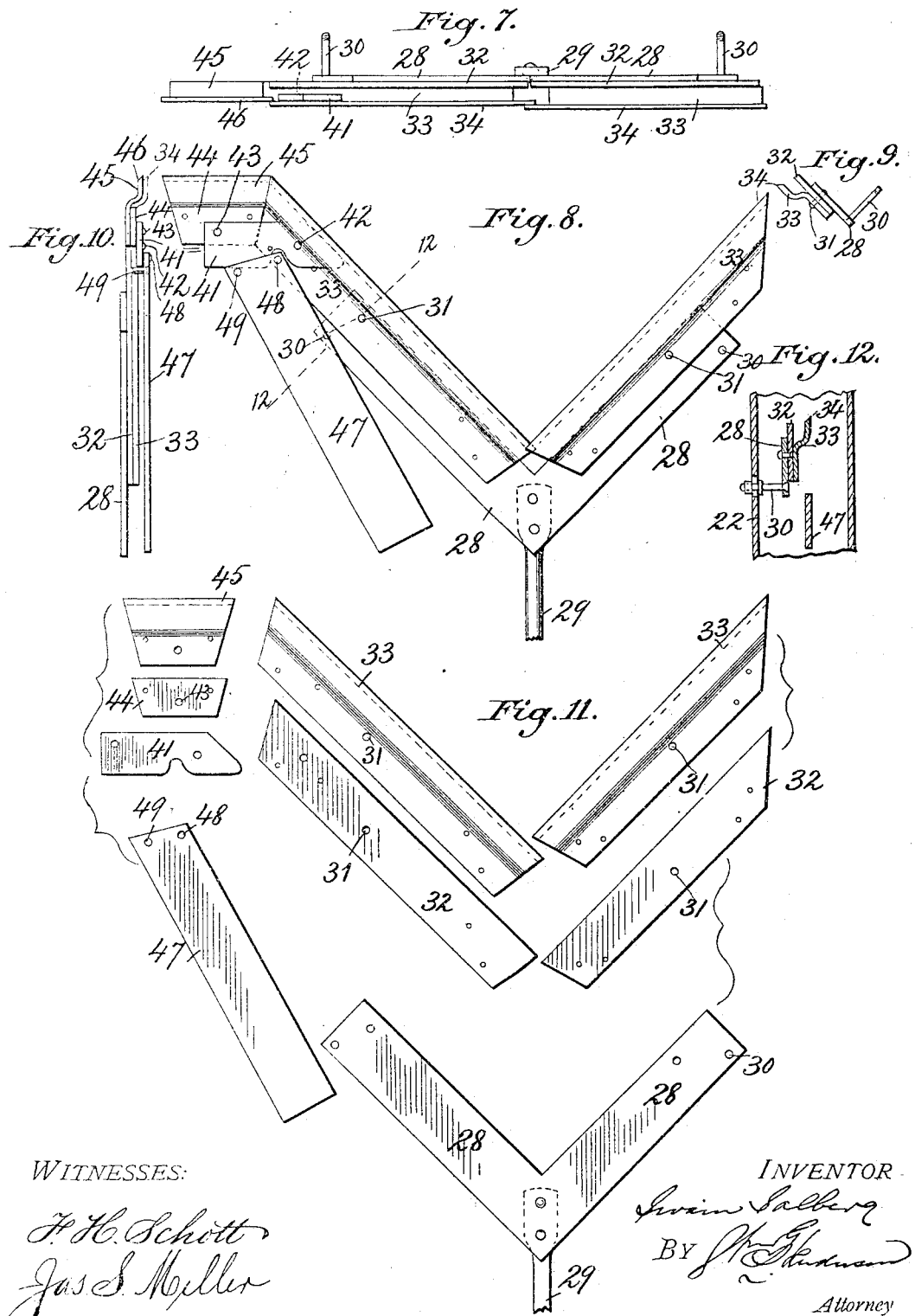

UNITED STATES PATENT OFFICE.

SWAIN SALBERG, OF RIDGWAY, PENNSYLVANIA.

APPARATUS FOR MAKING LAMPBLACK.

No. 801,743.  Specification of Letters Patent.  Patented Oct. 10, 1905.

Application filed January 25, 1905. Serial No. 242,634.

*To all whom it may concern:*

Be it known that I, SWAIN SALBERG, a citizen of the United States, residing at Ridgway, in the county of Elk and State of Pennsylvania, have invented certain new and useful Improvements in Apparatus for Making Lampblack; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to apparatus for making lampblack, more particularly of the type for which I obtained United States Letters Patent November 15, 1892, No. 486,127. It has for its object to provide an arrangement of a series of the pans rotatably connected one with the other, so that the rotation of one pan by means provided for the purpose will be transmitted to the other pans of the series; and it has, further, for its object to provide an improved construction of scrapers for detaching the lampblack from the pan or pans, as well as improved means for adjustably or yieldingly holding the scrapers in contact with the pans for detaching the lampblack therefrom.

To the accomplishment of the foregoing and such other objects as may hereinafter appear the invention consists in features of construction as well as in combination of parts hereinafter particularly described and then sought to be clearly defined by the claims, reference being had to the accompanying drawings, forming a part hereof, and in which—

Figure 1 is a vertical section of the apparatus; Fig. 2, a plan view with parts broken away; Figs. 3, 4, 5, and 6, detail views of certain parts; Fig. 7, a plan view of one set of scrapers; Fig. 8, a side view of the same; Fig. 9, an end view looking from the right of Fig. 8; Fig. 10, an end view looking from the left of Fig. 8; Fig. 11, a front view of the various parts of the scraper detached from one another, and Fig. 12 a sectional view on the line 12 12 of Fig. 8.

In the drawings the numeral 1 designates an upright shaft, supported on a suitable step 2 and provided with a toothed wheel 3, with which meshes a worm 4, sustained by a suitable support 5 for the pupose of transmitting rotary motion to said shaft. The shaft supports at its upper end a circular pan 6, having a V-shaped bottom and provided around its upper edge with gear-teeth 7, which mesh with gear-teeth 8 and 9, formed, respectively, around the outer upper edge of the pans 10 and 11, placed by the side of the pan 6 and supported, respectively, by the upright shafts 12 and 13, so that as the pan 6 is rotated rotary motion will be transmitted to the side pans. Each pan is alike in its construction and is formed with a central hub 14, by which it is connected to its shaft, and around each hub is formed one or more flues 15 for the escape of products of combustion. Beneath the lowermost part of each pan is located a gas-burner pipe 16, which may be supported by hanger-arms 17, depending from a suitable support 18, each of said pipes being provided with nipples 19, so as to direct the gas-flame against the lowermost part of the pan. Each pan will be supplied with water from a supply-pipe 20, from which extends a valve-controlled pipe 21.

The construction and operation of the parts so far described are substantially the same as in my former patent hereinbefore referred to, except that in the present case the several pans are geared together by the annularly-disposed teeth at their upper ends, whereby the rotary movement of one pan is transmitted to the other pans.

Beneath the central pan and one of the side pans there is arranged a hopper 22, the upper portion of which is made to embrace the contiguous walls of the two pans, so that the lampblack detached from the walls of these two pans will fall into said hopper. This hopper may be supported in any suitable manner—for instance, by means of a hanging bracket 23, connected at its lower end by a plate 24 or otherwise to the hopper—and said hopper at its lower end will be provided with a trough 25, having a suitable conveyer for carrying off the lampblack discharged through the hopper into the trough. A second hopper 26 will be provided for the other pan, and this hopper will have a discharge-trough 27, which also will be provided with a suitable conveyer for carrying off the lampblack. A scraper will be provided for detaching the lampblack on the bottom of each pan, and as they will be constructed alike the description of one will answer for all. Each main scraper will consist of two diverging arms 28, connected to the upper end of a rod 29 and braced to one side of the hopper by means of laterally-extending rods 30, one for each arm, which rods will have a limited play in the wall of the hopper, so as to permit a vertical movement of the scraper. Each arm has pivotally connected to it by a pivot-pin 31 a scraper-blade composed, preferably, of two plates 32 and 33, the plate 33 being bent obliquely and then upwardly, as illustrated, so as to give it greater elasticity, and formed with a knife-edge 34 to bear against the bottom of the pan. The scraper-rod 29 at its lower end is reduced in thickness and passes through an angle-plate 35, which is pivoted by a pin 36 to a lever-arm 37, which is provided with an adjustable weight 38 at one end and is fulcrumed in a bracket 39, secured to the hopper, said bracket being formed with a slot 40, in which the lever-arm fits, so that it may oscillate therein and be properly sustained in position. The scraper-blade is pressed more or less closely against the bottom of the pan, according to the adjustment of the weight on the lever-arm, and by this weighted lever, together with the pivotal connection of the scraper-blades to the diverging arms, said blades are allowed to yield to any irregularities that may be in the bottom of the pan. By supporting the scraper-rod at its lower end in the pivoted step of the lever-arm the perpendicularity of the scraper-rod is maintained in the movements of the lever-arm.

For the purpose of scraping the horizontal portion of the pan's bottom next to the hub of the pan I provide an auxiliary scraper composed of a horizontally-extending arm or plate 41, pivotally connected by a pivot-pin 42 with the plate 33 of the scraper-blade, and to the outer end of this arm is pivotally connected, by means of a pivot-pin 43, a plate 44, to which is riveted or otherwise secured a blade 45, which is bent at its upper end obliquely and then upwardly, as illustrated, and is formed with a knife-edge 46 to bear against the bottom of the horizontally-extending portion of the pan. This auxiliary scraper is held in a yielding manner against the bottom of the pan by means of a weight arm or lever 47, which is pivotally connected by a pin 48 to the scraper arm or plate 33 and provided with a laterally-projecting pin 49, which bears against the lower edge of the plate or arm 41. This pivoted weight-lever is thus caused to exert an upward pressure against the plate or arm 41, which will cause the auxiliary scraper-blade to bear with a yielding pressure against the horizontal bottom portion of the pan, and the pivot-pins 42 and 43 will cause said parts to be automatically adjusted in the movements of the main scrapers. This in practice has been found to be a simple and efficient construction, which will effectively scrape the lampblack from the bottom of the pan and prevent binding or cramping of the parts. It will thus be observed that both the main scraper and the auxiliary scraper will be held in operative position by weighted levers. The bracket 50, to which is fulcrumed the scraper-rod of the scraper to the pan having the single hopper, may be located inside of that hopper, as illustrated. This bracket, however, is notched similarly to the brackets which support the other scraper-rods, so as to receive and hold in place the weighted lever, which acts upon the scraper-rod.

I have illustrated three pans as geared together; but it is obvious that the number may be increased and the same construction be employed whatever be the number.

While I have illustrated and described with particularity the preferred details of construction and arrangement of the several parts, yet it is obvious that changes can be made and essential features of my invention still be employed.

Having described my invention and set forth its merits, what I claim is—

1. In an apparatus for making lampblack, the combination of a series of annular pans, each provided with annularly-disposed gear-teeth around its upper end, the teeth of one pan meshing with the teeth of another pan so that movement will be transmitted from one pan to the other, and driving mechanism connected with one of said pans, substantially as described.

2. In an apparatus for making lampblack, the combination of a series of annular pans, each having a V-shaped bottom, hoppers to receive the lampblack detached from the bottoms of the pans, one of said hoppers being disposed to embrace the contiguous V-shaped portions of the bottoms of two of the pans, and scrapers arranged within the hoppers to detach lampblack from the bottoms, substantially as described.

3. In an apparatus for making lampblack, a pan having a V-shaped bottom, and a scraper for detaching lampblack from the bottom of the pan, said scraper comprising plates parallel with each other, one of said plates being bent obliquely to the other below the upper edge of the latter and then upwardly and having an edge to contact with the bottom of the pan, substantially as described.

4. In an apparatus for making lampblack, the combination with an annular pan, of a scraper for detaching the lampblack from the bottom of the pan, a rod to which the scraper is connected, a weighted lever for lifting said scraper, and a step pivotally connected to said lever and having the lower end of the scraper-rod supported therefrom, substantially as described.

5. In an apparatus for making lampblack, the combination with an annular pan, of a scraper for detaching the lampblack from the bottom of the pan, a rod to which the scraper is connected, a weighted lever for lifting said scraper, and a bracket formed with a notch in which said lever fits and constituting a fulcrum-support for the lever, substantially as described.

6. In an apparatus for making lampblack, the combination with an annular pan having a V-shaped bottom and a horizontally-extending central portion, of a weighted scraper for detaching the lampblack from the V-shaped bottom of the pan, and an auxiliary scraper for detaching lampblack from the horizontally-extending central portion of the pan, said auxiliary scraper comprising plates pivotally connected together, and a pivoted weight-arm having a laterally-projecting pin contacting with one of said pivotal plates to automatically press the scraper-blade against the horizontally-extending central portion of the pan, substantially as described.

In testimony whereof I affix my signature in presence of two witnesses.

SWAIN SALBERG.

Witnesses:
  GEO. R. DIXON,
  JAS. S. MILLER.